(12) United States Patent
Bartlett et al.

(10) Patent No.: US 8,556,431 B2
(45) Date of Patent: Oct. 15, 2013

(54) APPARATUS AND METHOD FOR REDUCING SPECKLE IN DISPLAY OF IMAGES

(75) Inventors: Terry Alan Bartlett, Dallas, TX (US); John David Jackson, Sachse, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 13/174,951

(22) Filed: Jul. 1, 2011

(65) Prior Publication Data

US 2011/0261328 A1 Oct. 27, 2011

Related U.S. Application Data

(62) Division of application No. 11/618,401, filed on Dec. 29, 2006, now Pat. No. 7,972,020.

(51) Int. Cl.
G03B 21/26 (2006.01)
G03B 21/28 (2006.01)
G09G 5/02 (2006.01)

(52) U.S. Cl.
USPC ............... 353/30; 353/82; 353/121; 345/698; 345/694

(58) Field of Classification Search
USPC ............... 353/121, 30, 82; 345/696, 698, 694
See application file for complete search history.

(56) References Cited

U.S. PATENT DOCUMENTS

| | | | |
|---|---|---|---|
| 4,035,068 A | 7/1977 | Rawson | |
| 4,155,630 A * | 5/1979 | Ih | 359/707 |
| 6,625,381 B2 * | 9/2003 | Roddy et al. | 385/147 |
| 2006/0028961 A1 | 2/2006 | Kim et al. | |
| 2006/0241431 A1 | 10/2006 | Kamiyama | |
| 2006/0251306 A1 | 11/2006 | Shin | |
| 2006/0256436 A1 | 11/2006 | Javidi | |
| 2007/0063938 A1 * | 3/2007 | Kuan et al. | 345/87 |
| 2008/0198334 A1 * | 8/2008 | Kasazumi et al. | 353/38 |
| 2009/0115917 A1 * | 5/2009 | Horikawa et al. | 348/745 |

* cited by examiner

Primary Examiner — Georgia Y Epps
Assistant Examiner — Magda Cruz
(74) Attorney, Agent, or Firm — Warren L. Franz; Wade J. Brady, III; Frederick J. Telecky, Jr.

(57) ABSTRACT

An apparatus and method of reducing speckle in projection of images is provided that includes the elements or features of producing a first image and displacing the first image to produce a second image that will reduce speckle relating to the first image when the first image and the second image are displayed on a display medium.

15 Claims, 5 Drawing Sheets

APPARATUS AND METHOD FOR REDUCING SPECKLE IN DISPLAY OF IMAGES

This application is a divisional of application Ser. No. 11/618,401, filed Dec. 29, 2006.

BACKGROUND OF THE DISCLOSURE

1. Field of the Disclosure

The disclosure herein relates generally to an apparatus and a method for displaying images.

2. Background Information

Spatial light modulators, which typically perform a form of spatial-variation on a property of a beam of light, such as its phase, intensity, etc., are used in sequential color display systems to project images for various video media sources such as High Definition Television (HDTV), Digital Video Disc (DVD) players, and Digital Visual Interface (DVI) devices. Viewers generally evaluate display systems based on criteria such as image size, resolution, contrast ratio, color purity, and brightness. Image brightness is a useful metric because the available brightness can limit the size of the projected image and because it can also control how well the image can be seen in high levels of ambient light. The brightness of a given projection display is sometimes increased by increasing the size of the light source used to form the image. However, increasing the size of the light source also increases the cost, size, and weight of the entire display system. Additionally, larger light sources generate undesirable additional heat.

Another approach to increasing the brightness at the display has been to use an inherently brighter light source, such as a laser. However, the use of laser illumination in projection display systems often results in a substantially random spatial intensity modulation known as "speckle." Speckle arises when viewing a coherent light, such as laser light, on a screen which is rough compared to the wavelength of the coherent light. The term "rough" typically means a surface whose local irregularities in depth are greater than one quarter of the wavelength of the coherent light. The appearance of speckle can vary as a viewer's head moves in relation to the screen, which can make the appearance of speckle even more objectionable. Thus, there is a need for a projection display system that can reduce speckle.

SUMMARY OF THE PRESENT DISCLOSURE

In one aspect, a method for producing an image is disclosed that includes producing a first image, displacing the first image in a selected direction to produce a second image that will reduce speckle relating to the first image when the first and second images are displayed on a display medium.

In another aspect, an apparatus for producing images for displaying on a display or projection medium is disclosed that may include a laser that produces light, a modulator that produces a plurality of images, and an optical element between the laser and the display medium for displacing the plurality of images so as to reduce speckle associated with the projection of the plurality of images on the projection medium.

Only certain exemplary features of the invention are summarized herein rather broadly in order that the detailed description thereof that follows may be better understood and in order that the contributions to the art may be appreciated. There are, of course, additional features of apparatus and method for reducing speckle in display images that are described hereinafter and which form the subject of the claims.

BRIEF DESCRIPTION OF THE DRAWINGS

The following figures form part of the present disclosure and are included to further demonstrate certain aspects of the claimed subject matter and should not be used to limit the claimed subject matter. The claimed subject matter may be better understood by reference to one or more of these drawings in combination with the description of drawings presented herein. Consequently, a more complete understanding of the embodiments and further features and advantages thereof may be acquired by referring to the following description taken in conjunction with the accompanying drawings, in which like elements are generally identified by like reference numerals, wherein:

It is to be noted, that the appended drawings illustrate only typical embodiments of the claimed subject matter and are, therefore, not to be considered limiting the scope of the claimed subject matter.

DETAILED DESCRIPTION OF THE DRAWINGS

Illustrative embodiments of the claimed subject matter are described in detail below. In the interest of clarity, not all features of an actual implementation are described in this specification. It will of course be appreciated that numerous implementation-specific changes and modifications will be apparent to one skilled in the art upon having the benefit of this disclosure and which changes and modifications may vary from one embodiment to another and may be made without departing from the scope of the claimed subject matter.

Figure 1:
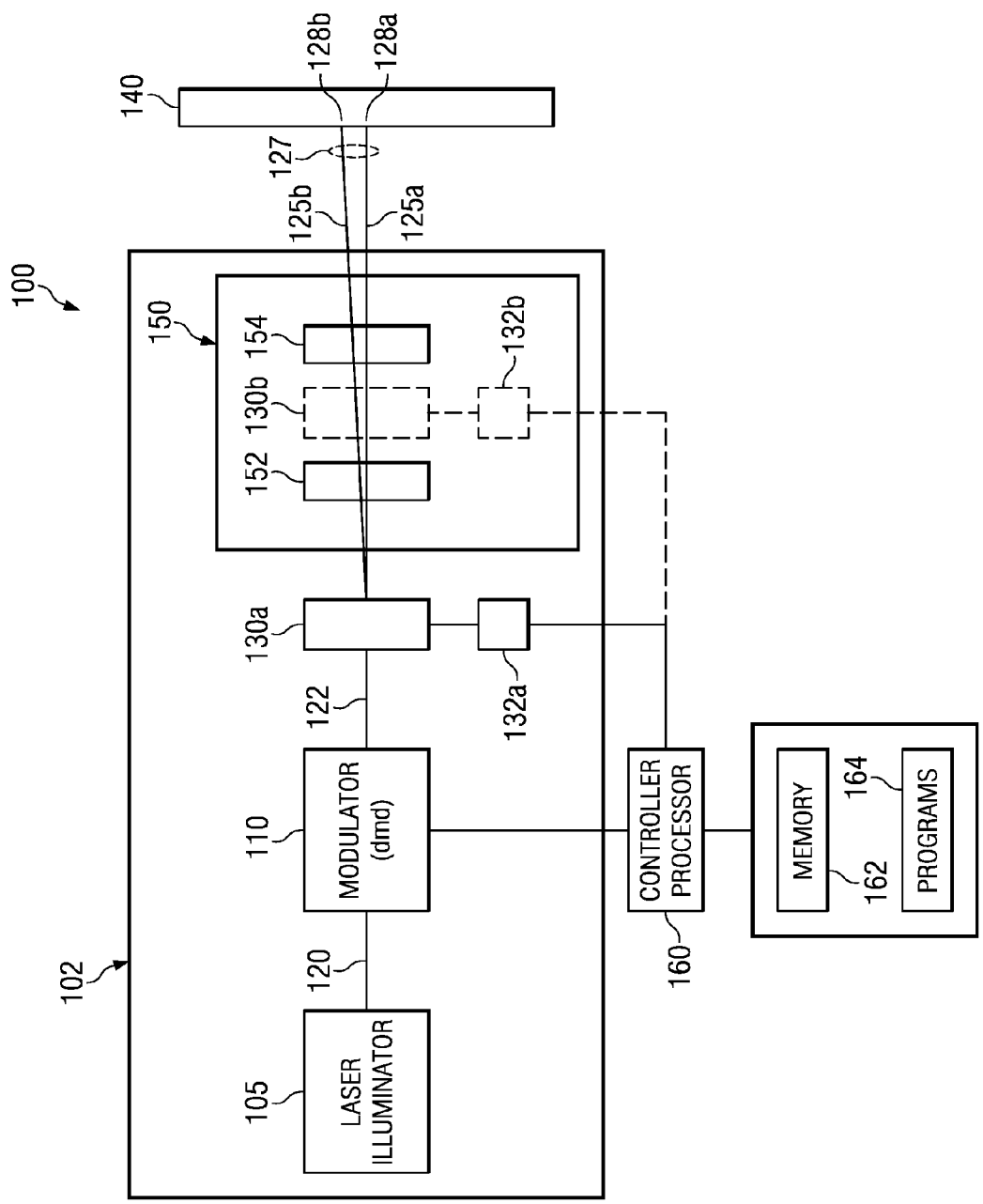
FIG. 1 schematically illustrates an exemplary projection display system usable to reduce speckle in the display of laser-illuminated images.

FIG. 1 schematically illustrates an exemplary embodiment or configuration of a projection system 100 (also referred to as the projection display system) for reducing speckle relating to the display of images on a display medium. In one aspect, the projection system 100 produces at its output a beam of light 125a for projection onto a suitable display or projection medium 140. The display medium 140 may be any suitable medium, including but not limited to a flexible or rigid surface that has diffusive properties in transmission or scattering properties in reflection. The display medium may be a rear-projection screen or a front-projection screen or another surface, such as a paper, fabric, wall, plastic and the like. The projection system 100 includes a light display system 102 that may house certain image-producing components of the light projection system 100, including: an illuminator, such as laser 105 (also referred to as a laser illuminator) for producing visible light (e.g. light of primary colors red, blue, and green) that is generally used for image formation in projection display systems; and a light modulator 110, such as a digital micromirror device (DMD) for converting a light beam 120 from the laser illuminator 105 into individual pixels which form an image at the display medium 140. The modulator 110 may include an array of individual micromirrors that digitally operate to reflect individual pixels corresponding to the light beam. Digital micromirror devices and other modulators are known in the art and are thus not described in detail herein. Any other suitable modulator may also be used for the purpose of this disclosure.

The light display system 102 also includes an image-displacement device (also referred to as the displacement device), such as a device 130a, and a projection lens module or system 150. The projection lens system 150 may include one or more rear-end lenses 152 and one or more front-end lenses 154. The image-displacement device 130a, in one mode allows the light beam 122 to pass in the direction delivered by the modulator 110 as shown by beam 125a. In another mode, the image-displacement device shifts or displaces the light beam 122 by a selected amount along a selected direction as shown by light beam 125b.

In FIG. 1, the light beam 125b is shown shifted from the initial beam 125a by a distance defined by gap 127 along a particular direction. The original beam 125a and the displaced beam 125b produce images 128a and 128b on the display medium 140 respectively. The image-displacement device 130a may be moved in any desired direction so as to be able to displace the received images, such as images in the beam 122, by a desired amount in a desired direction and at a desired frequency. Any suitable actuator (device or mechanism) 132a may be used to cause the displacement device 130a to move to displace the received images. In one aspect, the actuator 132a may be a piezoelectric element or device that can be actuated to periodically move the image-displacement device 130a by any suitable amount in any suitable direction and at any suitable frequency. Thus, the image-displacement device 132a can optically dither the received images by a selected amount in a selected direction and at a selected frequency.

In one aspect, the image-displacement device 130a may be placed along the path of beam 122 and between the modulator 110 and the projection lens system or block 150 as shown by element 130a. In another aspect, the image-displacement device may be placed within the projection lens system or block 150, such as shown by the image displacement device 130b. FIG. 1 shows the image-displacement device 130b placed between the rear-end lenses 152 and front-end lenses 154. The image-displacement device 130a or 130b may, however, be placed or positioned at any other suitable location within the projection system 100, including between the projection lens 154 and the display medium 140. The image-displacement device 130a may be any suitable optical element or device, including but not limited to one or more lenses, one or more mirrors, a transmissive plate with parallel faces or surfaces or an optical element having non-parallel faces or surfaces (such as wedges), one or more prisms, etc. When mirrors are used as the images-displacement device, the incident light beam strikes the mirrors at a selected angle that is deflected by the mirrors. The mirrors may be moved by an actuator to obtain the desired displacement of the received images.

The projection system 100 may further include a controller 160 for controlling the operation of various elements of the light display system 102. In one aspect, the controller 160 may include a processor, such as a microprocessor, and may have an associated memory 162 for storing data and computer programs 164 that provide programmed instructions to the processor 160 for controlling the operation of one or more elements of the projection system 100. In one aspect, the controller 160 provides signals to the actuator 132a or 132b that control the movement of the image-displacement device 130a or 130b. In another aspect, the controller 160 may also be used to control the operation of the modulator 110. The controller 160 may select the operating parameters, such as the amount, direction and frequency of operation of the displacement device 130a or 130b from a look-up table or according to algorithms and instructions contained in the programs 164. In one aspect, the controller 160 may select one or more such parameters based on a throw ratio or distance between the image-displacement device 130a or 130b and the display medium 140 or any other suitable criterion.

The laser 105 may be any suitable light source, including but not limited to, light-emitting diodes, super-luminescent diodes, solid-state lasers, gas lasers, liquid lasers, diode-pumped solid-state lasers, direction-emission diodes, and the like. In one aspect, the laser 105 is a coherent light source that may include one or more lasers. In one aspect, the light beam 120 may include more than one beam, for example, three beams of light, generally at wavelengths representative of red, green, and blue light. In one aspect, each color of light may be produced by an individual laser source.

In operation, the modulator 110, in one aspect, may produce a series of sequential images or frames at a selected frequency, for example a frequency between 20 Hz and 60 Hz. The controller at a first instance of time allows the displacement device to pass the image without displacing the image and a fraction of time later (i.e., at a second instance of time or later time) moves the image-displacement device by a selected amount in a selected direction, which produces a displaced image corresponding to the original image. The displaced image passes to the lens block 150 a fraction of time later than the original image. In this manner the original image, such as image 125a is first displayed on the display medium 140 and the displaced image 125b corresponding to the original image 125a is displayed a fraction of time thereafter. In one aspect, each image or frame may be displaced in the sequence received and projected in the received order. The time between successive images or frames is referred to as a frame time. Therefore, in the example discussed, each image is displaced within a frame time so that the displaced image is projected after projecting its corresponding image but before the arrival of the next image. The frequency of the displaced images may be the same as the frequency of the original images received by the displacement device. Images may be displaced by the same amount, such as about one pixel length or less, or by different amounts and in the same or different directions. The direction may be horizontal, vertical, rotational, or at any selected angle of a two dimensional display medium, such a screen, CRT or LCD, etc.

Figure 2:
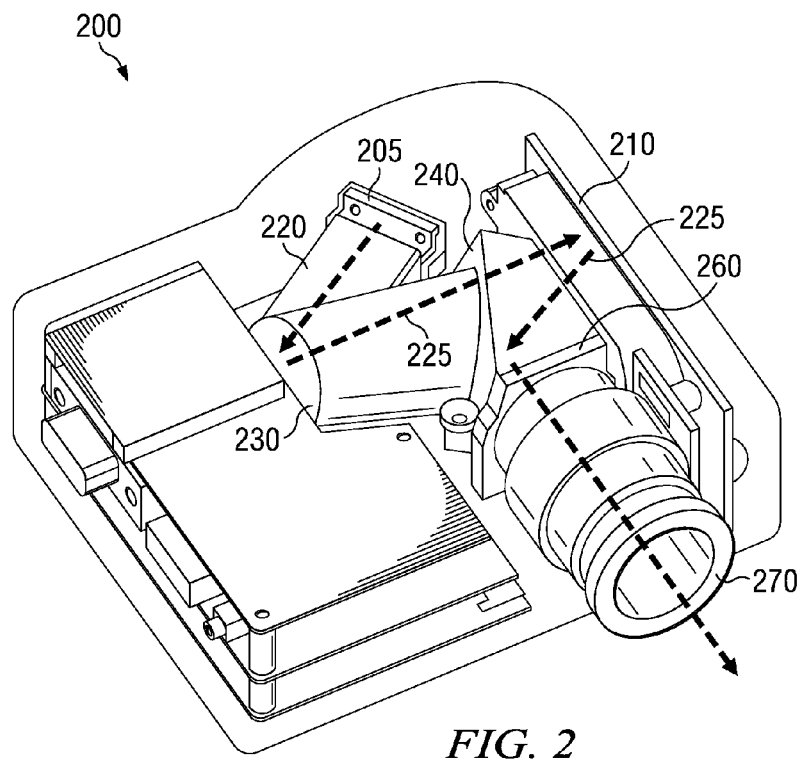
FIG. 2 schematically illustrates an isometric view of an exemplary embodiment of a projection display system that includes a speckle reduction feature of FIG. 1.

FIG. 2 shows an exemplary light projection system 200 (also referred herein as a "projector") usable to project a spatially modulated light beam as described in the present disclosure. The light projection system 200 includes a coherent light source such as a laser illuminator 205. The light projection system 200 includes one or more light collection, integration, and/or etendue-matching optical elements 220 arranged to collect and/or to integrate spatially light emitted by the light source 205. Etendue, as one skilled in the art and having the benefit of the present disclosure would know, is the product of the area of emission and the solid angle into which the emission is emitted. The light projection system 200 may also optionally include a telecentric relay 230 using one or more aspherical refractive and/or reflective components (not shown), and/or a pupil (not shown) for controlling stray light. The projector 200 may also optionally include an illumination wedge prism 240 to direct a light beam such as beam 225 towards an optical element. The projector 200 also includes a spatial light modulator (SLM) 210, such as the digital micromirror device (DMD), arranged to modulate spatially substantially the light 225 projected onto it. The projector may also include a projection total internal reflection (TIR) prism 260 disposed between the illumination wedge prism 240 and the DMD 210. In one aspect, the TIR prism 260 may be separated by an air gap (not shown) from the illumination wedge prism 240. The projector 200 may also include a projection lens 270 for projecting the output beam onto a display screen. The image-displacement device (130a or 130b), actuator (130a or 130b), and controller 160 shown in FIG. 1 may be placed within the projector 200 at any suitable location as described in reference to FIG. 1.

The telecentric relay 230 can provide substantially all the light emitted by the laser illuminator 205 through the illumination wedge prism 240 and through the projection total internal reflection (TIR) prism 260 to the DMD 210. The DMD reflects and spatially modulates light 225 back through the TIR prism 260 that internally reflects the spatially modulated light 220 through the projection lens 270 and onto a projection display screen, such as screen 140 (FIG. 1).

Figure 3:
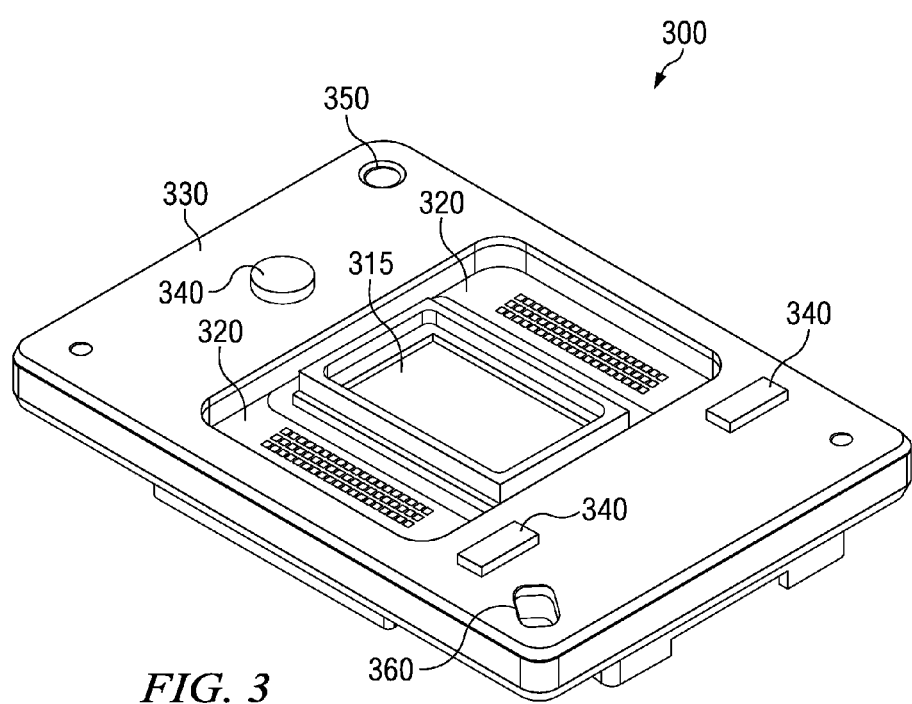
FIG. 3 schematically illustrates an exemplary spatial light modulator suitable for use in the projection display systems of FIGS. 1 and 2 for producing images.

FIG. 3 shows a schematic illustration of an exemplary spatial light modulator (SLM) 300 suitable for use with the present disclosure. FIG. 3 shows, in particular, a top perspective view of an SLM 300 usable with an integrated circuit, such as the micro-electro-mechanical system (MEMS) spatial light modulator (SLM) integrated circuit. The SLM 300 has a wafer level package (WLP) DMD chip 315 bonded thereon. One of ordinary skill in the art having the benefit of the present disclosure would appreciate that the device 300 could be used with any suitable integrated circuit, including the MEMS SLM integrated circuit described herein. In one aspect, the device 300 may have the DMD chip 315 wire-bonded on two sides to bond pad area 320. The device 300 may also have one or more primary datum ('A') alignment features 340, one or more secondary datum ('B') alignment features 350, and one or more tertiary datum ('C') alignment features 360 disposed on the top surface 330. In one embodiment, the SLM may be actuated to orient a light beam at a frequency consistent to provide an image of a single frame at a display screen. Each micromirror of the SLM is actuated according to a selected program. In one aspect, a micromirror may be actuated in response to an electric current passing through a piezoelectric material attached to the micromirror.

Figure 4:
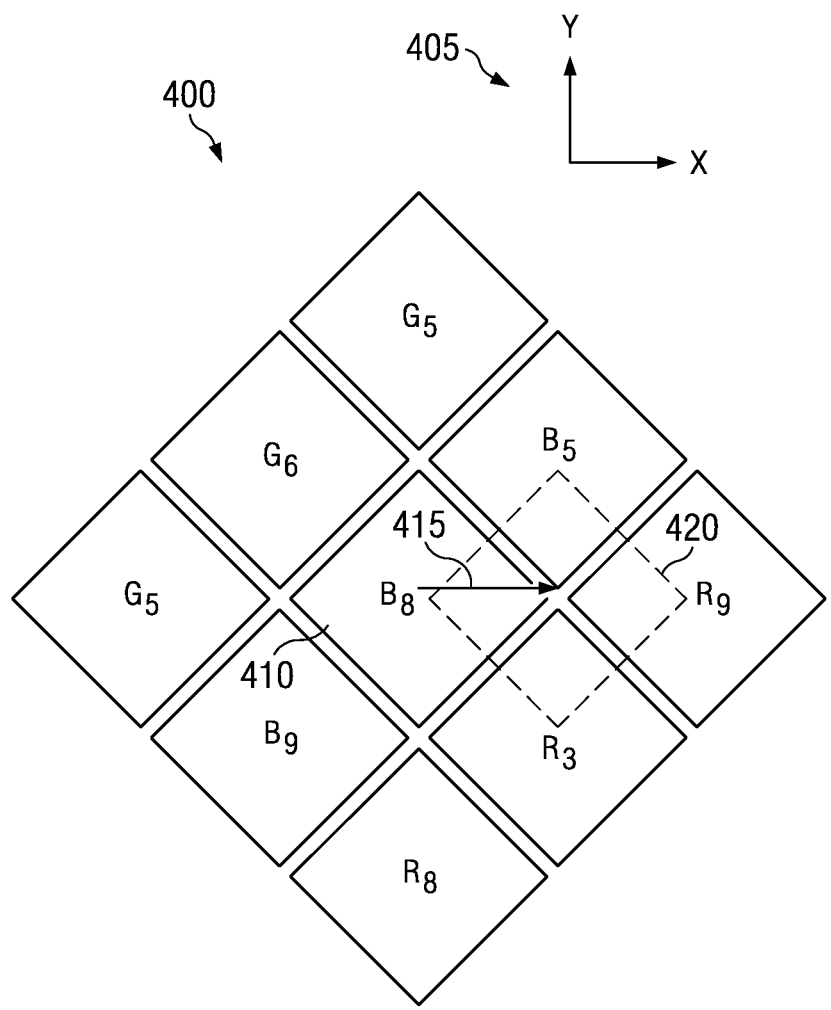
FIG. 4 schematically illustrates an exemplary pixel field produced using the exemplary spatial light modulators of FIG. 3 and the effect of displacing or shifting a particular pixel.

FIG. 4 shows an exemplary field of pixels as viewed at a display screen in one aspect of the present disclosure. The illustrative field includes a plurality of pixels arranged along a grid 400 oriented at an angle to a coordinate system 405. Each pixel is further characterized by a color code associated with the pixel. As shown schematically in FIG. 4, each one of the plurality of the pixels 410 may be represented by a respective bit value $R_i$, $G_j$, $B_k$, where the bit values $R_i$, $G_j$, $B_k$ may correspond to a suitable "gray scale" encoding of the appropriate red, green, and blue components of the digitally encoded image, such as $R_i \equiv 2^i R$, $G_j \equiv 2^j G$, $B_k \equiv 2^k B$, where R, G, B are respective elemental (or base) bit values for the red, green, and blue components of the digitally encoded image. Although the illustrated pixels are squares, the pixel is not restricted to a particular shape. Also, the rotational orientation of the grid and pixels therein may be arbitrarily selected.

In accordance with the present disclosure, a pixel may be displaced by an amount selected to reduce speckle. In one aspect the image is displaced at least ¼ pixel and at most 1 pixel. A typical displacement may be about ½ pixel as shown through the displacement of pixel 410 to a pixel location 420 through displacement vector 415. The reduction of the visible speckle from the projection display screen 140 may be produced by the substantially incoherent addition of phasors. This substantially incoherent addition of phasors may be produced by projecting pixel 410 and displaced pixel 415 within a time frame that is shorter than the reflex time of the human eye. In one aspect, the pixel may be displaced along a horizontal axis or along a vertical axis or a linear vector combination of both horizontal and vertical displacement. FIG. 4 illustrates the displacement of one pixel against a grid of pixels. In operation, typically a plurality of the pixels, such as the pixels of grid 400, are displaced simultaneously along the direction of the displacement vector 415.

In one aspect, the actuator 130a or 132b (FIG. 1) displaces the output beam substantially within about a frame time of the light display system 102. For example, if there are about 60 frames per second, then the corresponding frame time of the projection system is about ⅟60 sec=16⅔ millisec. The image displacement (also referred to herein as "dithering") may be done relatively quickly as compared to the temporal response of the eye, which may be about the duration of a single frame time or longer.

Figure 5:
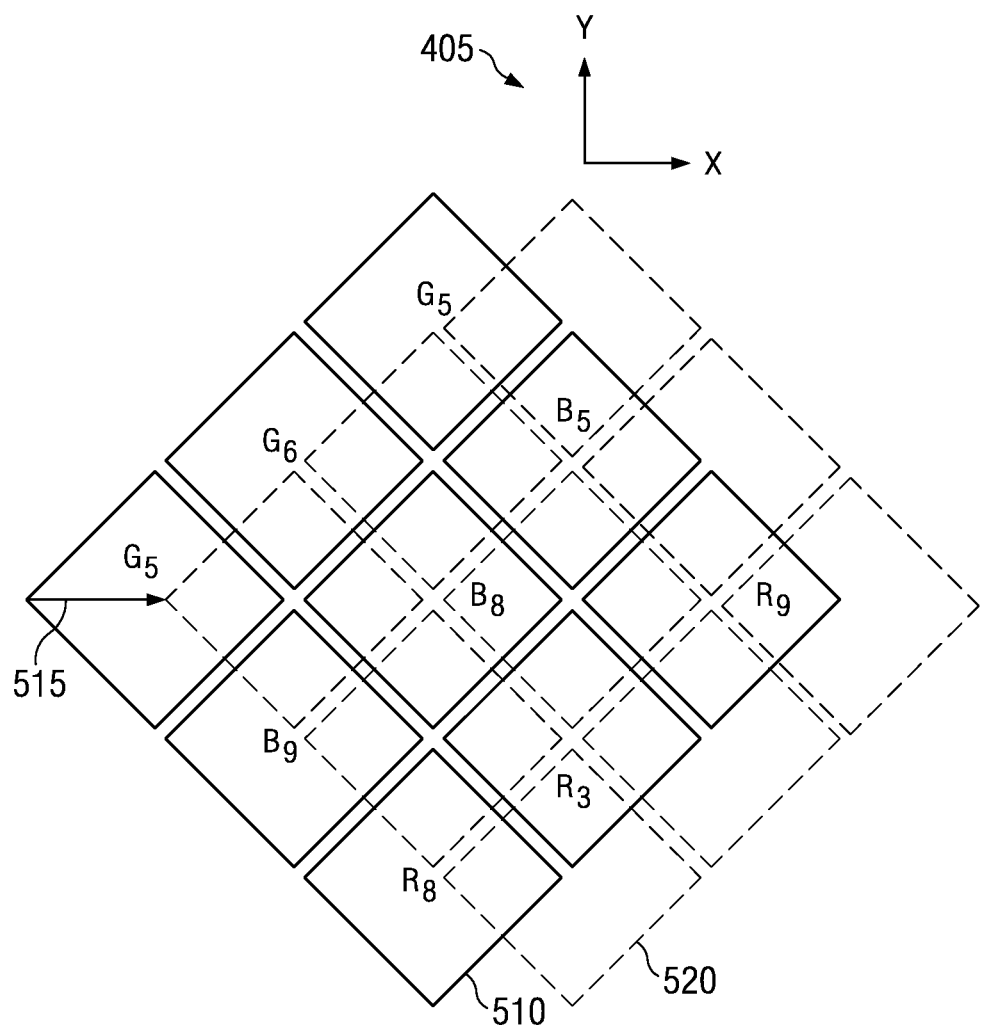
FIG. 5 schematically illustrates another exemplary pixel field produced by the spatial light modulator of FIG. 3 and the effect of displacing or shifting a set of pixels.

FIG. 5 schematically illustrates an exemplary pixel field 500 produced at a display medium and the effect of displacing or shifting a set of pixels. The original pixel field 500 produced by the laser illuminator is shown to include a set of arbitrary pixels (as an example for illustration purposes only), including pixels designated as G5, G6, G5 (green), B5, B8, B9 (blue) and R8, R3, R9 (red). In this example all of the pixels in the set 510 are shown oriented in an angular direction of 45 degrees relative to an x-y plane 405. The oriented set of pixels is shown by dotted set 520. The set 510 may be displaced in any other direction by any desired amount. The set 520 is produced a fraction of time subsequent to the production of set 510 and each set is displayed on the projection medium in the order produced.

Figure 6:
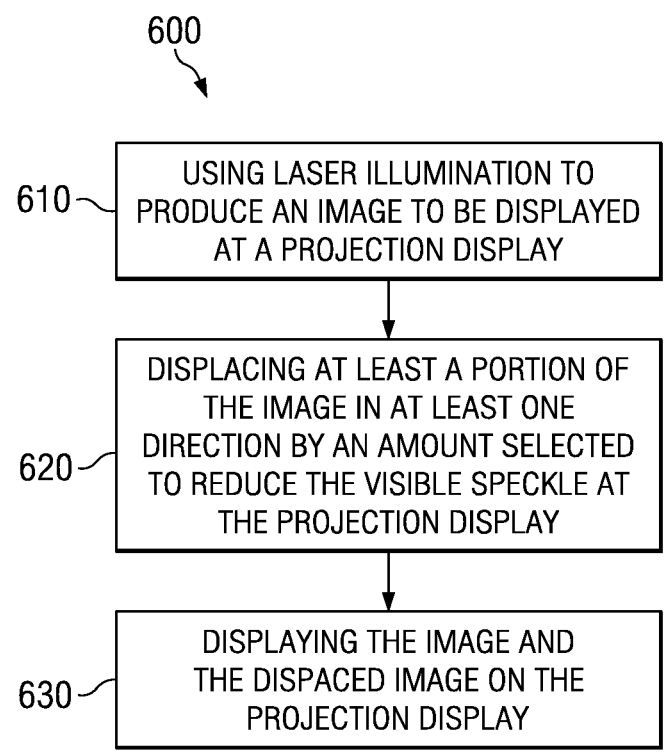
FIG. 6 illustrates a flowchart of an exemplary method for reducing visible speckle in a laser-illuminated projection display system, according to one aspect of the disclosure.

FIG. 6 shows a flowchart of an exemplary method 600 of reducing speckle in a projection display. The method 600 includes using laser illumination to produce an image to be displayed at the projection display, as indicated at box 610. The method 600 also includes displacing at least a portion of the image in at least one direction by an amount arranged to reduce the visible speckle at the projection display, as indicated at box 620. The method 600 also includes displaying the image and the displaced image sequentially on the projection display, as indicated at box 630.

The method 600 may further include displacing a pixel by at most one pixel length and may include displacing a pixel by at least ¼ of a pixel length. The method may further include displacing a pixel within a time frame which maximizes speckle reduction, typically a frequency within the range of 30 Hz to 60 Hz. In another aspect, the image may be displaced from between a quarter pixel and 1 pixel within one frame time. In one aspect, an actuator is used to displace the pixel periodically. In another aspect, a prior image is used and shown at both the non-displaced pixel and the displaced pixel. The pixel may be displaced along an x-axis or y-axis or along a vector defined by a linear combination of x- and y-displacements. In another aspect, a proper subset of the pixel that form an image may be displaced.

Thus, in one aspect, the disclosure herein provides a method for reducing speckle in display images. The method includes producing a first image using laser illumination for displaying on a display medium; and producing a second image that includes at least a portion of the first image, wherein the second image is physically displaced from the first image by a selected amount in a selected direction so as to reduce visible speckle relating to the projection of the first image on the display medium. In one aspect, the second image may be produced within a frame time after producing the first image. The physical displacement of the second image from the first image may be any desired amount, such as between a quarter of a pixel to one pixel of the first image. The displacement direction may be any suitable direction, including, but not limited to (i) a horizontal direction; (ii) a vertical direction; (iii) at a linear combination of horizontal and vertical directions; or (iv) an angular direction.

In another aspect, the method may comprise: producing a first plurality of images using a laser-illuminator for sequential projection of the first plurality of images onto a display medium; and producing a second plurality of images, wherein each image in the second plurality of images corresponds to an image in the first plurality of images, and wherein each image in the second plurality of images is displaced relative to its corresponding image in the first plurality of images so as to reduce speckle relating to projection of the first plurality of images onto the display medium. In one aspect, the method provides for producing the second plurality of images in a manner that includes one of: (i) a displacement of less than one pixel; (ii) a displacement in a direction that is one of horizontal, vertical, a linear combination of horizontal and vertical; or at an angle relative to the direction of the first plurality of images; (iii) producing each displaced image within a frame time; and/or (iv) at a frequency that is about the same as that of the frequency of the first plurality of images.

In another aspect, some of the images in the first plurality of images may be displaced. Any displaced image may include all or a portion of an image or a frame. The method further provides for producing the second plurality of images by controllably moving an optical element between the laser-illuminator and the display medium. The optical element may be placed: (i) between a modulator and a projection lens; or (ii) within a projection lens block that includes at least one lens that is adapted to project the first and second plurality of images onto the display medium. One or more computer programs stored in a memory or computer-readable medium associated with the controller include instructions that are executed by the controller to perform the various aspects, features or steps of the methods provided herein. The method may further provide for selecting the frequency of the second plurality of images based on one of: (i) a throw ratio; and (ii) a distance between an optical element in a laser illumination system that displaces the first plurality of images and the image display medium. The first plurality of images and the second plurality of images may be projected sequentially at a selected frequency wherein the images in the second plurality of images are projected within frame time of their corresponding images in the first plurality of images.

In another aspect, the disclosure provides an apparatus for producing images for displaying on a projection medium that includes a laser illuminator that produces a plurality of images in a first time sequence; a lens that projects the plurality of images onto a projection medium; and an optical element between the laser-illuminator and the lens for selectively displacing the first plurality of images so as to reduce speckle associated with the plurality of images on the projection medium. The optical element may be any suitable device that can displace the images, such as a lens or a mirror. An actuator, such as a piezoelectric element, may be used to move the optical element. A controller that may include a processor may be used to control the optical element to displace or shift the images in the plurality of images by an amount that is at least one of: (i) less than one pixel of an image in the plurality of images; (ii) in a direction that is one of horizontal, vertical, a linear combination of horizontal and vertical, at an angle relative to the first plurality of images; (iii) at a frequency that is the same as that of the first plurality of images; and (iv) with a time difference of less than a frame. The optical element may be placed at any suitable location within the apparatus, including between the laser illuminator and a projection lens that projects the images, within a lens block that includes one or more projection lenses, or between a projection lens and the display medium. The controller may select the frequency for displacing or shifting the images in the plurality of images based on one of: (i) a throw ratio; (ii) distance of an optical element that shifts the images in the plurality of images and the display medium. The apparatus may further include a light source and a micromirror device for generating the plurality of images.

In another aspect, an image projection system is disclosed that includes a laser-illuminator that produces a plurality of light beams sequentially; a modulator that produces a plurality of images using the plurality of light beams; an actuator that displaces the plurality of images by a selected amount in a selected direction to reduce speckle associated with the projection of the plurality of images on the display medium. The display medium may be one of (i) a cathode ray tube; (ii) a liquid crystal display; or (iii) a flexible screen.

Each apparatus made and method practiced according to the disclosure can be useful for reducing visible speckle in a laser illuminated projection display and may be advantageous in providing an improved approach to the use of inherently brighter light sources, such as ones using laser emissions. The terms image displacement, shifting and image dithering are used synonymously. In each case, the image displacement may be relatively small, for example one pixel or less, in either or both dimensions. The image displacement or dithering may be done relatively rapidly compared with the temporal response of the human eye which is generally within a frame time for digital display. An optical element or device, such as a lens or a scanning mirror is selectively controlled to displace the images. The displacement of the images may be done without prior image processing or with prior image processing. The images can be continuously or discretely dithered over a smaller extent, which may provide speckle reduction with relatively little reduction in resolution.

While the foregoing disclosure is directed to certain embodiments that may include certain specific elements, such embodiments and elements are shown as examples and various modifications thereto apparent to those skilled in the art may be made without departing from the concepts described and claimed herein. It is intended that all variations within the scope of the appended claims be embraced by the foregoing disclosure.

What is claimed is:

1. A projection display system, comprising:
   a light source for producing a beam of coherent light;
   a spatial light modulator for converting the beam of coherent light into individual image pixels which form an image at a display medium;
   a projection lens system;
   an image-displacement device, positioned between the modulator and at least a portion of the projection lens system, for shifting the converted light beam to sequentially displace pixel positions of the image formed at the display medium by an amount, in a direction and at a frequency for optically dithering the formed images to reduce speckle; and wherein the defined amount, direction and frequency shifts the converted light beam to displace the pixel positions by one pixel length or less.

2. The system of claim 1, wherein the image-displacement device is at least one of a: (i) lens; (ii) mirror; (iii) transmissive element; (iv) plate having parallel faces; and (v) optical element having non-parallel faces.

3. The system of claim 1, wherein the image-displacement device displaces the pixel positions in a manner that is at least one of: (i) in a horizontal direction; (ii) in a vertical direction; (iii) at an angle; and (iv) at a frequency that is the same as that of an image frame time.

4. The system of claim 1, wherein the light source includes at least one of a: (i) solid-state laser diode; (ii) liquid laser; (iii) gas laser; (iv) light-emitting diode; (v) diode-pumped solid-state laser: (vi) laser using direct emission diodes; and (vi) super-luminescent diodes.

5. The system of claim 1, wherein the display medium is at least one of: (i) a surface having a diffusive property; and (ii) a surface having a scattering property.

6. The system of claim 1, wherein the image pixels form an image comprised of multiple rows and columns of pixels and the shifting displaces the pixel positions of the formed image in a direction aligned with the rows of the image.

7. The system of claim 1, wherein the image pixels form an image comprised of multiple rows and columns of pixels and the shifting displaces the formed image in a direction aligned with the columns of the image.

8. The system of claim 1, wherein the image-displacement device comprises a mirror.

9. The system of claim 1, wherein the defined amount, direction and frequency shifts the converted light beam to displace the pixel positions by one pixel length or less so that each image is first formed as an original image at the display medium and then again formed as a displaced image corresponding to the original image at the display medium within an image frame time.

10. The system of claim 1, further comprising an actuator coupled for driving the image-displacement device to shift the converted light beam.

11. The system of claim 10, wherein the actuator is a piezoelectric element.

12. The system of claim 10, further comprising a controller for providing signals to the actuator that control the driving of the image-displacement device.

13. The system of claim 12, wherein the controller defines an amount, direction and frequency for movement of the image-displacement device for a given throw ratio or distance between the image-displacement device and display medium.

14. The system of claim 1, wherein the defined amount, direction and frequency shifts the converted light beam to displace the pixel positions by at least one-quarter pixel length.

15. The system of claim 14, wherein the controller defines the amount, direction and frequency using a look-up table.

* * * * *